(12) United States Patent
Mathews et al.

(10) Patent No.: US 9,886,299 B2
(45) Date of Patent: Feb. 6, 2018

(54) SYSTEM AND METHOD FOR DYNAMICALLY ALLOCATING RESOURCES OF VIRTUAL MACHINES BASED ON SERVICE-LEVEL AGREEMENTS (SLA) AND PRIVILEGE LEVELS OF USERS

(71) Applicant: American Megatrends, Inc., Norcross, GA (US)

(72) Inventors: Santhosh Samuel Mathews, Chennai (IN); Sudhakar Errappa Parthasarathy, Chennai (IN); Varadachari Sudan Ayanam, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 39 days.

(21) Appl. No.: 14/811,290

(22) Filed: Jul. 28, 2015

(65) Prior Publication Data
US 2017/0031698 A1 Feb. 2, 2017

(51) Int. Cl.
| | | |
|---|---|---|
| G06F 9/455 | (2006.01) | |
| H04L 12/24 | (2006.01) | |
| G06F 9/48 | (2006.01) | |
| G06F 9/44 | (2006.01) | |

(52) U.S. Cl.
CPC ........ *G06F 9/45558* (2013.01); *G06F 9/4445* (2013.01); *G06F 9/4856* (2013.01); *H04L 41/5003* (2013.01); *G06F 2009/4557* (2013.01); *G06F 2009/45579* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,352,692 | B1 * | 4/2008 | Saleh | H04J 14/0284 370/216 |
| 8,380,850 | B1 * | 2/2013 | Ahuja | H04L 47/12 709/223 |
| 2005/0138175 | A1 * | 6/2005 | Kumar | G06F 9/5072 709/226 |
| 2009/0210527 | A1 * | 8/2009 | Kawato | G06F 9/45558 709/224 |

(Continued)

*Primary Examiner* — Emerson Puente
*Assistant Examiner* — Zhi Chen
(74) *Attorney, Agent, or Firm* — Locke Lord LLP; Tim Tingkang Xia, Esq.

(57) ABSTRACT

Systems and methods for dynamically allocating resources of virtual machines (VMs) using service level agreements (SLAs) and privilege levels of users. The system includes VM servers for executing the VMs. When a software application is to be executed on one executed VM on a VM server, a management device determines, from a first table, the privilege level of each executed VM based on the SLA, and then retrieves, from a second table, the resource allocation information for the software application to be executed using the privilege level of the executed VM. If, based on the resource allocation information, the resource of the VM server is determined to be unavailable for execution of the software application, one or more executed VMs having a lower privilege level on the VM server may be migrated to other VM servers to free up the resources.

26 Claims, 6 Drawing Sheets

(56) References Cited

U.S. PATENT DOCUMENTS

| | | | |
|---|---|---|---|
| 2013/0165133 A1* | 6/2013 | Lagerqvist | H04W 72/0486 455/450 |
| 2013/0219385 A1* | 8/2013 | Geibel | G06F 9/45558 718/1 |
| 2014/0007097 A1* | 1/2014 | Chin | G06F 9/45533 718/1 |
| 2014/0157058 A1* | 6/2014 | Bennah | G06F 11/3604 714/38.1 |
| 2016/0117180 A1* | 4/2016 | Cardonha | G06F 9/44505 713/100 |

* cited by examiner

310

| | 312 | 314 | 316 |
|---|---|---|---|
| | VM | User | Privilege Level |
| | VMID1 | User ID1 | Privilege Level 2 |
| | VMID2 | User ID2 | Privilege Level 1 |
| | VMID3 | User ID3 | Privilege Level 2 |
| | VMID4 | User ID4 | Privilege Level 3 |

| Application (322) | Privilege Level (324) | Network Requirement (327) | CPU Requirement (328) | Memory Requirement (329) |
|---|---|---|---|---|
| Application 1 | Privilege Level 1 | 8 Mbps | 25% | 4 GB |
| Application 2 | Privilege Level 1 | 2 Mbps | 30% | 2 GB |
| Application 3 | Privilege Level 1 | 6 Mbps | 5% | 200 MB |
| Application 1 | Privilege Level 2 | 5 Mbps | 10% | 2 GB |
| Application 2 | Privilege Level 2 | 1 Mbps | 15% | 1 GB |
| Application 3 | Privilege Level 2 | 3 Mbps | 2% | 100 MB |
| Application 1 | Privilege Level 3 | 2 Mbps | 4% | 500 MB |
| Application 2 | Privilege Level 3 | 650 Kbps | 7% | 100 MB |
| Application 3 | Privilege Level 3 | 1 Mbps | 1% | 50 MB |

(326 spans columns 327, 328, 329)

| Privilege Level (332) | Permissible Limit Rate (334) |
|---|---|
| Privilege Level 1 | 0% |
| Privilege Level 2 | 5% |
| Privilege Level 3 | 10% |

FIG. 3C

SYSTEM AND METHOD FOR DYNAMICALLY ALLOCATING RESOURCES OF VIRTUAL MACHINES BASED ON SERVICE-LEVEL AGREEMENTS (SLA) AND PRIVILEGE LEVELS OF USERS

FIELD

The present disclosure relates generally to virtual desktop infrastructure (VDI) technology, and more particularly to systems and methods for dynamically allocating resources of virtual machines (VMs) based on service-level agreements (SLAs) and privilege levels of users.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an organization having multiple users having access to computer system operations, each user may be assigned with a privilege, which indicates the level of the user to access the resource of the computer systems, according to the position of the user, safety concerns, or other factors that may be deemed important to the organization. Based on the assigned privileges, the users may be categorized into different groups. For example, in an organization, a group of people may be labeled as privileged users, which include high privileged people such as directors, heads and managers in the organization, and the rest of people in the organization may be ordinary users, such as the officers, engineers and supervisors. Generally, if each user is assigned with a computer, the privileged users will be provided with desktop or laptop computers with higher end hardware configurations, and the performance of these computers used by the privileged users will be much better than that of the ordinary users.

However, in a VDI system, all users are accessing or connecting to the virtual machines (VMs) from their thin client or zero client terminal computers. In this case, resources and corresponding performance of the system will be shared to all of the VMs accessed by the users. Since each VM may be subject to different workload, the sharing process of the resources and performance will be dynamic, thus making it difficult to provide an optimized sharing mechanism for the VDI system based on user privileges.

Therefore, an unaddressed need exists in the art to address the aforementioned deficiencies and inadequacies.

SUMMARY

In one aspect, the present disclosure relates to a system for dynamically allocating resources of virtual machines (VMs). In certain embodiments, the system includes a plurality of VM servers configured to execute a plurality of VMs, and to execute a plurality of software applications on each of the executed VMs, where the VMs are each assigned with one of a plurality of privilege levels; and a management device communicatively connected to the VM servers. The management device includes a processor and a storage device storing computer executable code, a first table containing information of the privilege levels for each of the VMs, and a second table containing resource allocation information for each of the software applications to be executed on the VMs being assigned with the privilege levels. When the computer executable code is executed at the processor, the computer executable code is configured to: (1) control the VM servers to execute the VMs; (2) identify, for each of the executed VMs, a service level agreement (SLA); and (3) in response to receiving an application launching message to indicate one of the software applications is to be executed on one of the executed VMs in one of the VM servers, (a) determine, from the first table, the privilege level of each of the executed VMs based on information of the SLAs corresponding to the executed VMs; (b) retrieve, from the second table, the resource allocation information for the software application to be executed on the one of the executed VMs based on the privilege level of the one of the executed VMs; (c) determine, based on the resource allocation information for the software application to be executed, whether resource of the VM server is available for execution of the software application; (d) in response to determining the resource of the VM server to be unavailable for execution of the software application, migrate at least one of the executed VMs having a lower privilege level on the VM server to other VM servers to free up the resource of the VM server; and (e) in response to determining the resource of the VM server to be available for execution of the software application, control the VM server to execute the software application.

In certain embodiments, the computer executable code, when executed at the processor, is configured to identify the SLA for each of the executed VMs by: identifying, for each of the executed VMs, a corresponding user; and identifying the SLA of the corresponding user for each of the executed VMs.

In certain embodiments, the first table is a VM, user and privilege (VUP) table, storing information of a plurality of VM identifications (VMIDs) corresponding to the VMs, a plurality of user identifications corresponding to users of the VMs, and the privilege levels corresponding to each of the VM identifications and each of the user identifications.

In certain embodiments, the computer executable code, when executed at the processor, is configured to determine, from the first table, the privilege level of each of the executed VMs by: for each of the executed VMs, obtaining the VMID of the executed VM; and retrieving the privilege level of the executed VM by looking up the privilege level corresponding to the VMID from the first table. In certain embodiments, the VMID is obtained from the SLA corresponding to the executed VM.

In certain embodiments, the second table is a resource allocation table (RAT) storing information of the software applications, the privilege levels, and the resource allocation information for each of the software applications corresponding to each of the privilege levels. In certain embodiments, the resource of the VM server comprises network bandwidth of the VM server, central processing unit (CPU) load of the VM server, and free system memory space of the VM server. In certain embodiments, for each of the software applications, the resource allocation information comprises information of a network bandwidth bit rate of the VM server, a CPU load percentage of the VM server, and a free memory size of the VM server.

In certain embodiments, the computer executable code, when executed at the processor, is further configured to periodically check available resource of each of the VM servers.

In certain embodiments, the storage device further stores a third table storing information of the privilege levels and corresponding permissible limit rate for each of the privilege levels. In certain embodiments, the computer executable code, when executed at the processor, is configured to determine whether the resource of the VM server is available for execution of the software application by: comparing the available resource of the VM server to required resource for the software application to be executed based on the resource allocation information; when the required resource for the software application to be executed is not greater than the available resource of the VM server, executing the software application on the VM server; and when the required resource for the software application to be executed is greater than the available resource of the VM server, (i) retrieving, from the third table, the corresponding permissible limit rate to each of the privilege levels; and (ii) re-assigning the resource of the VM server to the executed software applications on all of the executed VMs on the VM server, wherein for each of the executed VMs, the resource allocated to each of the executed software applications on the executed VM is reduced by the corresponding permissible limit rate based on the privilege level of the executed VM; and (iii) determining whether the re-assigned resource of the VM server is available for execution of the software application.

In certain embodiments, the computer executable code, when executed at the processor, is configured to control the VM servers to execute the VMs by: in response to receiving a VM launching message to indicate one of the VMs is to be launched, retrieving, from the first table, the privilege level of the VM to be launched; determining whether at least one of the VM servers has the available resource to launch the VM; when none of the VM servers has the available resource to launch the VM, migrating at least one of the executed VMs having a lower privilege level on one of the VM servers to other VM servers to free up the resource of the VM server until at least one of the VM servers has the available resource to launch the VM; and when one of the VM servers has the available resource to launch the VM, launching the VM on the VM server, and re-assigning the resource of the VM server to the executed software applications on all of the executed VMs on the VM server.

In another aspect, the present disclosure relates to a method for dynamically allocating resources of virtual machines (VMs). In certain embodiments, the method includes: (1) controlling, by a management device, a plurality of VM servers to execute a plurality of VMs, wherein a plurality of software applications is configured to be executed on each of the executed VMs, and the VMs are each assigned with one of a plurality of privilege levels; (2) identifying, by the management device, a service level agreement (SLA) for each of the executed VMs; and (3) in response to receiving, by the management device, an application launching message to indicate one of the software applications is to be executed on one of the executed VMs in one of the VM servers, (a) determining, from a first table containing information of the privilege levels for each of the VMs, the privilege level of each of the executed VMs based on information of the SLAs corresponding to the executed VMs; (b) retrieving, from a second table containing resource allocation information for each of the software applications to be executed on the VMs being assigned with the privilege levels, the resource allocation information for the software application to be executed on the one of the executed VMs based on the privilege level of the one of the executed VMs; (c) determining, based on the resource allocation information for the software application to be executed, whether resource of the VM server is available for execution of the software application; (d) in response to determining the resource of the VM server to be unavailable for execution of the software application, migrating at least one of the executed VMs having a lower privilege level on the VM server to other VM servers to free up the resource of the VM server; and (e) in response to determining the resource of the VM server to be available for execution of the software application, controlling the VM server to execute the software application.

In certain embodiments, for each of the executed VMs, the SLA is identified by: identifying, for each of the executed VMs, a corresponding user; and identifying the SLA of the corresponding user for each of the executed VMs.

In certain embodiments, the first table is a VM, user and privilege (VUP) table, storing information of a plurality of VM identifications (VMIDs) corresponding to the VMs, a plurality of user identifications corresponding to users of the VMs, and the privilege levels corresponding to each of the VM identifications and each of the user identifications. In certain embodiments, the privilege level of each of the executed VMs is determined by: obtaining the VMID of the executed VM from the SLA corresponding to the executed VM; and retrieving the privilege level of the executed VM by looking up the privilege level corresponding to the VMID from the first table.

In certain embodiments, the second table is a resource allocation table (RAT) storing information of the software applications, the privilege levels, and the resource allocation information for each of the software applications corresponding to each of the privilege levels. In certain embodiments, the resource of the VM server comprises network bandwidth of the VM server, central processing unit (CPU) load of the VM server, and free system memory space of the VM server; and for each of the software applications, the resource allocation information comprises information of a network bandwidth bit rate of the VM server, a CPU load percentage of the VM server, and a free memory size of the VM server.

In certain embodiments, the method further includes: periodically checking available resource of each of the VM servers.

In certain embodiments, whether the resource of the VM server is available for execution of the software application is determined by: comparing the available resource of the VM server to required resource for the software application to be executed based on the resource allocation information; when the required resource for the software application to be executed is not greater than the available resource of the VM server, executing the software application on the VM server; and when the required resource for the software application to be executed is greater than the available resource of the VM server, (i) retrieving, from a third table, corresponding permissible limit rate to each of the privilege levels; (ii) re-assigning the resource of the VM server to the executed software applications on all of the executed VMs on the VM server, wherein for each of the executed VMs, the resource allocated to each of the executed software applications on the executed VM is reduced by the corresponding permissible limit rate based on the privilege level of the executed VM; and (iii) determining whether the re-assigned resource of the VM server is available for execution of the software application.

In certain embodiments, the VM servers are controlled to execute the VMs by: in response to receiving a VM launching message to indicate one of the VMs is to be launched, retrieving, from the first table, the privilege level of the VM to be launched; determining whether at least one of the VM servers has the available resource to launch the VM; when none of the VM servers has the available resource to launch the VM, migrating at least one of the executed VMs having a lower privilege level on one of the VM servers to other VM servers to free up the resource of the VM server until at least one of the VM servers has the available resource to launch the VM; and when one of the VM servers has the available resource to launch the VM, launching the VM on the VM server, and re-assigning the resource of the VM server to the executed software applications on all of the executed VMs on the VM server.

A further aspect of the present disclosure relates to a non-transitory computer readable medium storing computer executable code. When the computer executable code is executed at a processor of a management device, the computer executable code is configured to: (1) control a plurality of VM servers to execute a plurality of VMs, wherein the management device is communicatively connected to the VM servers, a plurality of software applications is configured to be executed on each of the executed VMs, and the VMs are each assigned with one of a plurality of privilege levels; (2) identify, for each of the executed VMs, a service level agreement (SLA); and (3) in response to receiving an application launching message to indicate one of the software applications is to be executed on one of the executed VMs in one of the VM servers, (a) determine, from a first table containing information of the privilege levels for each of the VMs, the privilege level of each of the executed VMs based on information of the SLAs corresponding to the executed VMs; (b) retrieve, from a second table containing resource allocation information for each of the software applications to be executed on the VMs being assigned with the privilege levels, the resource allocation information for the software application to be executed on the one of the executed VMs based on the privilege level of the one of the executed VMs; (c) determine, based on the resource allocation information for the software application to be executed, whether resource of the VM server is available for execution of the software application; (d) in response to determining the resource of the VM server to be unavailable for execution of the software application, migrate at least one of the executed VMs having a lower privilege level on the VM server to other VM servers to free up the resource of the VM server; and (e) in response to determining the resource of the VM server to be available for execution of the software application, control the VM server to execute the software application.

In certain embodiments, the computer executable code, when executed at the processor, is configured to identify the SLA for each of the executed VMs by: identifying, for each of the executed VMs, a corresponding user; and identifying the SLA of the corresponding user for each of the executed VMs.

In certain embodiments, the first table is a VM, user and privilege (VUP) table, storing information of a plurality of VM identifications (VMIDs) corresponding to the VMs, a plurality of user identifications corresponding to users of the VMs, and the privilege levels corresponding to each of the VM identifications and each of the user identifications. In certain embodiments, the computer executable code, when executed at the processor, is configured to determine, from the first table, the privilege level of each of the executed VMs by: for each of the executed VMs, obtaining the VMID of the executed VM from the SLA corresponding to the executed VM; and retrieving the privilege level of the executed VM by looking up the privilege level corresponding to the VMID from the first table.

In certain embodiments, the second table is a resource allocation table (RAT) storing information of the software applications, the privilege levels, and the resource allocation information for each of the software applications corresponding to each of the privilege levels. In certain embodiments, the resource of the VM server comprises network bandwidth of the VM server, central processing unit (CPU) load of the VM server, and free system memory space of the VM server; and for each of the software applications, the resource allocation information comprises information of a network bandwidth bit rate of the VM server, a CPU load percentage of the VM server, and a free memory size of the VM server.

In certain embodiments, the computer executable code, when executed at the processor, is further configured to periodically check available resource of each of the VM servers.

In certain embodiments, the computer executable code, when executed at the processor, is configured to determine whether the resource of the VM server is available for execution of the software application by: comparing the available resource of the VM server to required resource for the software application to be executed based on the resource allocation information; when the required resource for the software application to be executed is not greater than the available resource of the VM server, executing the software application on the VM server; and when the required resource for the software application to be executed is greater than the available resource of the VM server, (i) retrieving, from a third table storing information of the privilege levels and corresponding permissible limit rate for each of the privilege levels, the corresponding permissible limit rate to each of the privilege levels; (ii) re-assigning the resource of the VM server to the executed software applications on all of the executed VMs on the VM server, wherein for each of the executed VMs, the resource allocated to each of the executed software applications on the executed VM is reduced by the corresponding permissible limit rate based on the privilege level of the executed VM; and (iii) determining whether the re-assigned resource of the VM server is available for execution of the software application.

In certain embodiments, the computer executable code, when executed at the processor, is configured to control the VM servers to execute the VMs by: in response to receiving a VM launching message to indicate one of the VMs is to be launched, retrieving, from the first table, the privilege level of the VM to be launched; determining whether at least one of the VM servers has the available resource to launch the VM; when none of the VM servers has the available resource to launch the VM, migrating at least one of the executed VMs having a lower privilege level on one of the VM servers to other VM servers to free up the resource of the VM server until at least one of the VM servers has the available resource to launch the VM; and when one of the VM servers has the available resource to launch the VM, launching the VM on the VM server, and re-assigning the resource of the VM server to the executed software applications on all of the executed VMs on the VM server.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 3A schematically depicts a VM, user and privilege (VUP) table according to certain embodiments of the present disclosure.

FIG. 3B schematically depicts a resources allocation table (RAT) according to certain embodiments of the present disclosure.

FIG. 3C schematically depicts a permissible limit table according to certain embodiments of the present disclosure.

DETAILED DESCRIPTION

Figure 1A:
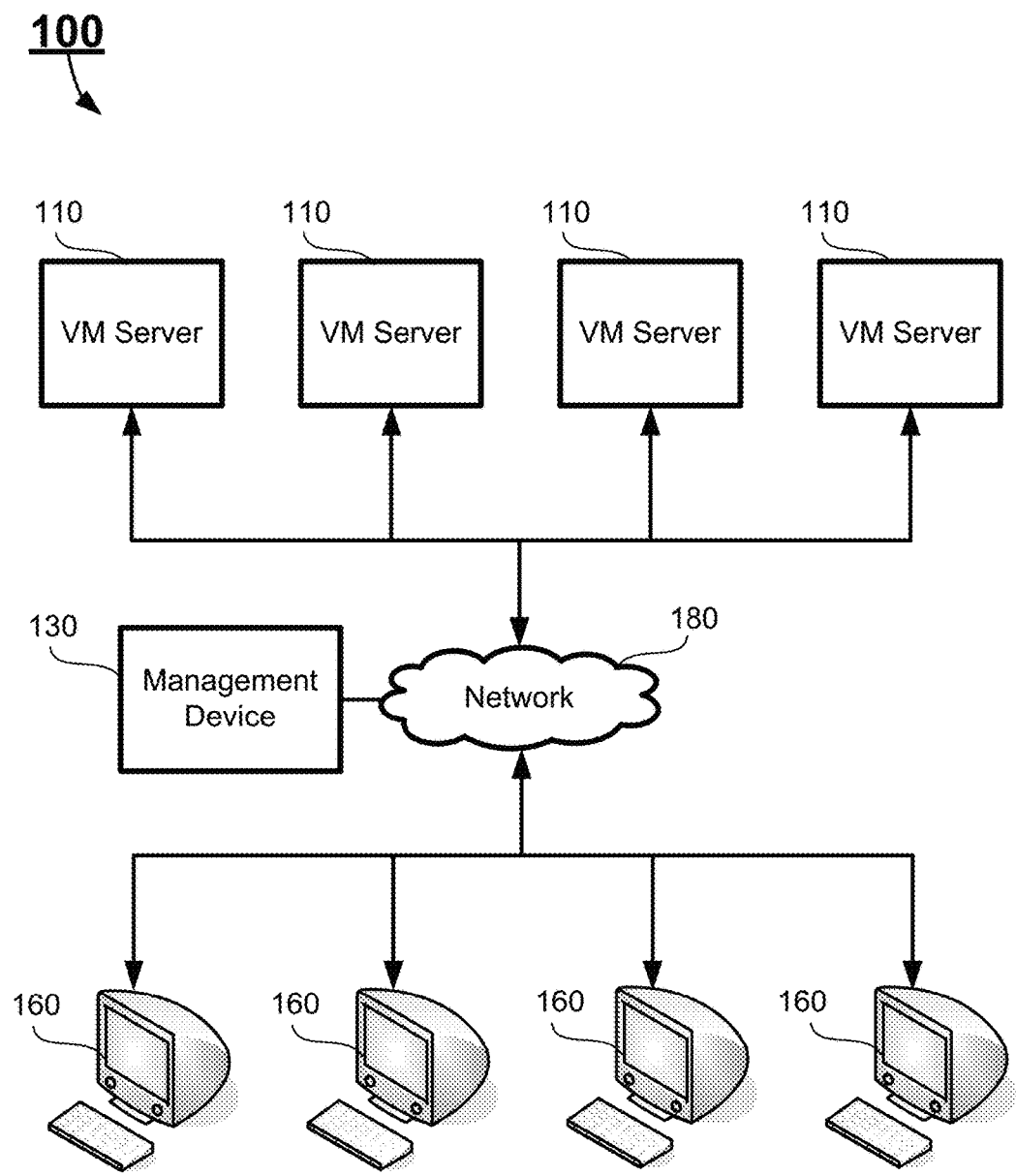
FIG. 1A schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "launching a virtual machine", as used herein, generally refers to a process of initiating or constructing a new virtual machine instance with a specific virtual machine ID on a hypervisor. Once the virtual machine is launched, the virtual machine in an "on" state. The term "shutting down a virtual machine", as used herein, generally refers to a process of deleting or destructing an existing virtual machine instance with a specific virtual machine ID on a hypervisor. Once the virtual machine is destructed, the virtual machine is in an "off" state.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As discussed above, in a VDI system, all users are accessing or connecting to the VMs from their thin client or zero client terminal computers, and resources and corresponding performance of the system will be shared to all of the VMs accessed by the users. Generally, the resources and corresponding performance shared to each user may depend on, without being limited to, the following factors: (1) network bandwidth available to the user; (2) network bandwidth of each VM server at which the user is connected; (3) workload on the VMs; (4) total load on the VM server where the user is connected; and (5) free memory space in the VDI server.

In the VDI system, the privileged users may enjoy having more performance requirements as if they were in a typical computer system. Thus, ideally, the VMs of these privilege users should be run in a light load server, or required resources may be allocated to these VMs to fulfill the higher performance requirements. Thus, the present disclosure proposes a way to maintain the service-level agreement (SLA) of the users in order to dynamically allocate resources to the VMs based on the applications running on the VMs, the privilege levels of the users and availability of resources in the VDI servers where the VM is running. If it is impossible to maintain the SLA of the users by dynamically allocating resources in one of the servers, the VMs may be migrated across different VDI servers such that all users may enjoy optimized performances.

Service level is generally used to measure the performance of a system. Certain goals are defined and the service level gives the percentage to which those goals should be achieved. The SLA is a part of a service contract where a service is formally defined. Particular aspects of the service, such as scope, quality, and responsibilities, are agreed between the service provider and the service user. In the VDI system, each user of the system may have a corresponding SLA, which define the service priorities and privilege level of the user. Thus, the technique to dynamically allocate resources in the VDI servers may be based on the software applications running and the user privilege levels. Specifically, two factors may be considered in resource allocation of VMs: one is the type of the software applications running in the VM at any given point of time, and the other is the privilege level of the user who is using the VM.

In accordance with the purposes of present disclosure, as embodied and broadly described herein, in certain aspects, the present disclosure relates to a virtual desktop infrastructure (VDI) system 100. FIG. 1A schematically depicts an exemplary system according to certain embodiments of the present disclosure. As shown in FIG. 1A, the system 100 includes a plurality of VM servers 110, a management device 130, and a plurality of computing devices 160. The VM servers 110, the management device 130 and the computing devices 160 are communicatively interconnected by a network 180. The network 180 may be a wired or wireless network, and may be of various forms, such as a public network and a private network. Examples of the network 180 may include, but not limited to, a local area network (LAN) or wide area network (WAN) including the Internet. In certain embodiments, two or more different networks 180 may be applied to connect the VM servers 110, the management device 130, and the computing devices 160.

Each of the VM servers 110 is a server to provide VM services for the system 100. For resource allocation purposes, the system 100 may have two or more VM servers 110. In certain embodiments, each of the VM servers 110 may be a computing device functioning as the server. Although FIG. 1A shows four VM servers 110, the number of the VM servers 110 of the system 100 may vary depending on the system requirements.

The management device 130 is a controller that manages a plurality of servers and services provided thereon, such as the VM servers 110. Specifically, the management device 130 controls and manages the dynamic allocation of resources of the VMs running in the VM servers 110 of the system 100. In certain embodiments, the management device 130 may be implemented by a server or a computing device independent from the VM servers 110 and the computing device 160. In certain embodiments, the management device 130 may be implemented by a system on chip (SoC), such as a baseboard management controller (BMC) or a service processor (SP), or by other management controllers.

Each of the computing devices 160 functions as a thin client or a zero client, which is operated by various users to access one of the virtual machines running on the VM servers 110. Although FIG. 1A shows four computing devices 160, the number of the computing devices 160 of the system 100 may vary depending on the system requirements and the number of VM users. In certain embodiments, a computing device 160, which functions as a thin client, corresponds to a particular VM. Thus, when the system 100 has M computing devices 160, the VM servers 110 may provide a total number of M virtual machines, where M is a positive integer, such that each user may access the corresponding VM using one of the computing devices 160.

Each of the computing devices 160 may be a desktop computer, a laptop computer, a notebook computer, a tablet computer, a smart mobile phone and/or other network connected terminal devices.

Figure 1B:
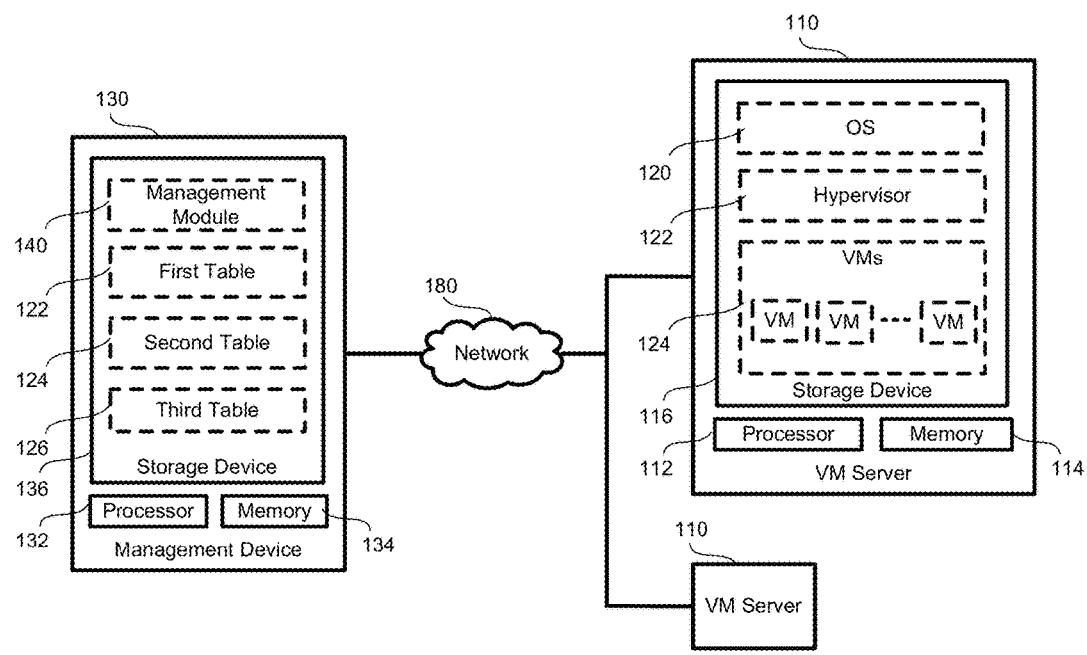
FIG. 1B schematically depicts the management device and the virtual machine servers of the exemplary system according to certain embodiments of the present disclosure.

FIG. 1B schematically depicts the management device and the virtual machine servers of the exemplary system according to certain embodiments of the present disclosure. As shown in FIG. 1B, the management device 130 is communicatively connected to two VM servers 110 by the network 180. It should be noted that the system 100 may include additional VM servers 110 based on the system requirements. Further, each of the VM servers 110 may include identical components to enable migrating of the VMs between the VM servers 110. For example, FIG. 1B only depicts the components of one VM server 110, without showing the components of the other VM server 110. In certain embodiments, the VM server 110 whose components are not depicted in FIG. 1B may be identical or similar to the VM server 110 whose components are illustrated FIG. 1B.

In certain embodiments, each of the VM servers 110 may include necessary hardware and software components to perform certain predetermined tasks. For example, as shown in FIG. 1B, the components of the VM server 110 includes a processor 112, a memory 114, and a storage device 116. Further, the VM server 110 may include other hardware components and software components (not shown) to perform its corresponding tasks. Examples of these hardware and software components may include, but not limited to, a network interface card (NIC), and other required memory, interfaces, buses, Input/Output (I/O) modules and peripheral devices.

The processor 112 is configured to control operation of the VM server 110. In certain embodiments, the processor 112 may be a central processing unit (CPU). The processor 112 can execute any computer executable code or instructions, such as the OS 120 of the VM server 110 or other applications and instructions of the VM server 110. In certain embodiments, the management device 110 may run on more than one processor, such as two processors, four processors, eight processors, or any suitable number of processors.

The memory 114 can be a volatile memory, such as the random-access memory (RAM), for storing the data and information during the operation of the VM server 110. In certain embodiments, the memory 114 may be a volatile memory array.

The storage device 116 is a non-volatile data storage media for storing the applications of the VM server 110. Examples of the storage device 116 may include non-volatile memory such as flash memory, memory cards, USB drives, hard drives, floppy disks, optical drives, or any other types of data storage devices. The access time of the storage device 116 varies widely among these storage devices listed here. For example, the flash memory, the memory cards and the USB drives are much faster than the hard drives, the floppy disks, and the optical drives, often in the ten, hundreds or thousands time. A typical hard drive is capable of up to 80-100 MB/s throughput when new. On the other hand, a one terabyte (TB) flash SSD using a PCI Express×8 interface may achieve a maximum write speed of 654 megabytes per second (MB/s) and maximum read speed of 712 MB/s. In certain embodiments, the VM server 110 may have multiple storage devices 116, which may be identical storage devices or different types of storage devices, and the applications may be stored in one or more of the storage devices 116 of the VM server 110.

As shown in FIG. 1B, the storage device 116 stores an operating system (OS) 120, a hypervisor 122, and a plurality of VMs 124. Specifically, the storage device 116 stores a persistent copy of each of the VMs 124. In certain embodiments, the storage device 116 may store other applications necessary for the operation of the VM server 110. For example, the storage device 116 may store a plurality of software applications. When at least one VM 124 is executed on the VM server 110, the software applications may be executed on each of the executed VMs 124. It should be noted that the OS 120, the hypervisor 122 and the VMs 124 may be each implemented by computer executable codes or instructions, which may be formed by software modules or stacks. In certain embodiments, the modules and tables may further include sub-modules.

The OS 120 is a collective management software application managing the operation of the VM server 110. For example, the OS 120 can include a set of functional programs that control and manage operations of the devices connected to the VM server 110. The set of application programs provide certain utility software for the user to manage the VM server 110. In certain embodiments, the OS 120 is operable to multitask, i.e., execute computing tasks in multiple threads. Examples of the OS 120 may be any of the commercial operating systems, such as Microsoft Windows, LINUX, UNIX, or any other operating systems.

The hypervisor 122 is a program that allows multiple VM 124 to run VM instances simultaneously and share a single hardware host, such as the VM server 110. The hypervisor 122, when executed at the processor 112 or any other processor, implements hardware virtualization techniques and allows one or more operating systems or other software applications to run concurrently as guests of one or more VM 124 on the VM server 110. The hypervisor 122 allows each user to run an operating system instance as a virtual machine. In certain embodiments, the hypervisor 122 can be of various types and designs, such as MICROSOFT HYPER-V, XEN, VMWARE ESX, or other types of hypervisors.

Figure 2:
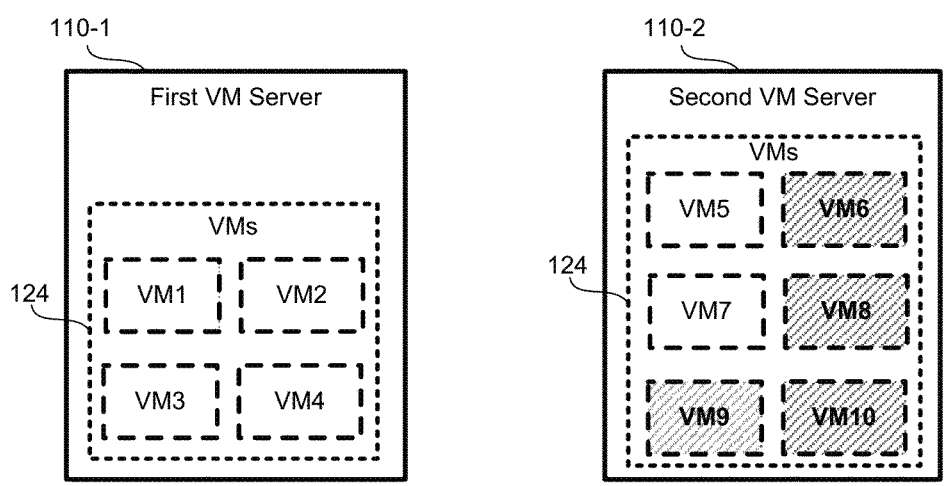
FIG. 2 schematically depicts execution of virtual machines on the virtual machine servers according to certain embodiments of the present disclosure.

FIG. 2 schematically depicts execution of virtual machines on the virtual machine servers according to certain embodiments of the present disclosure. As shown in FIG. 2, there are two VM servers 110, including a first VM server 110-1 and a second VM server 110-2. There are four VMs 124 running in the first VM server 110-1, which are labeled as VM1 to VM4, and six VMs 124 running in the second VM server 110-2, which are labeled as VM5 to VM10. Assuming that the users of the VMs 124 may include three different privilege levels, including a power user level (the highest level), a privileged user level, and an ordinary user level (the lowest level). Among the ten executed VMs 124, the VM1, VM4 and VM5 are accessed by the privileged users, and are shown in dotted blocks. The VM2, VM3 and VM7 are accessed by the ordinary users, and are shown in white blocks. The VM6, VM8, VM9 and VM10 are accessed by the power users, and are shown in slashed blocks. Thus, the first VM server 110-1 may only include VMs 124 accessed by the ordinary users and privilege users, while the second VM server 110-2 includes VMs 124 accessed by all three types of users, including the ordinary users, privilege users and power users.

As disclosed above, the performance of a VM 124 running in the VM server 110 depends upon the resource of the VM server 110, including network bandwidth of the VM server 110, CPU load of the VM server 110, and free system memory space of the VM server 110. If sufficient resources are not allocated to the VM 124, the response and user experience will not be up to the expectation for the user who is accessing the VM 124. Thus, the SLA has to be provided for each user to ensure that the user experience is as expected and guaranteed. Since the resource of each VM server 110 is defined and limited, to maintain the SLA for each user of the VMs 124 running on the VM server 110, adjustments and allocations of the resources may be required such that the sum of each resource used by each VM 124 is no greater than the total resources available in the VM server 110. For example, the four VMs 124 (VM1 to VM4) running in the first VM server 110-1 share the resources of the first VM server 110-1, and the six VMs 124 (VM5 to VM10) running in the second VM server 110-2 share the resources of the second VM server 110-2. If there is no sufficient resources in the second VM server 110-2 to be shared between the six VMs 124, adjustments and allocations of the resources of the second VM server 110-2 may be required, such that the sum of each resource used by each VM 124 (VM5 to VM10) running in the second VM server 110-2 is no greater than the total resources available in the second VM server 110-2. These adjustments and allocations of the resources may be performed by the management device 130.

In certain embodiments, the management device 130 may include necessary hardware and software components to perform certain predetermined tasks. For example, referring back to FIG. 1B, the management device 130 includes a processor 132, a memory 134, and a storage device 136. Further, the management device 130 may include other hardware components and software components (not shown) to perform its corresponding tasks. Examples of these hardware and software components may include, but not limited to, a NIC, and other required memory, interfaces, buses, I/O modules and peripheral devices.

The processor 132 is configured to control operation of the management device 130. In certain embodiments, the processor 132 may be a CPU. The processor 132 can execute any computer executable code or instructions, such as the applications and instructions stored in the storage device 136 of the management device 130. In certain embodiments, the management device 130 may run on more than one processor, such as two processors, four processors, eight processors, or any suitable number of processors.

The memory 134 can be a volatile memory, such as the random-access memory (RAM), for storing the data and information during the operation of the management device 130. In certain embodiments, the memory 134 may be a volatile memory array.

The storage device 136 is a non-volatile data storage media for storing the applications of the management device 130. Examples of the storage device 136 may include non-volatile memory such as flash memory, memory cards, USB drives, hard drives, floppy disks, optical drives, or any other types of data storage devices. In certain embodiments, the management device 130 may have multiple storage devices 136, which may be identical storage devices or different types of storage devices, and the applications may be stored in one or more of the storage devices 136 of the management device 130.

As shown in FIG. 1B, the storage device 136 of the management device 130 stores a management module 140, a first table 142, a second table 144, and a third table 146. In certain embodiments, the storage device 136 may store other applications necessary for the operation of the management device 130. It should be noted that the modules and tables stored in the storage device 136 are each implemented by computer executable codes or instructions, which may be collectively forms a single stack or module based on the form of the storage device 136. For example, when the management device 130 is a SoC, the modules and tables may be implemented as the firmware stored in a non-volatile memory (i.e., the storage device 136) of the SoC. In certain embodiments, the modules and tables may further include sub-modules.

The management module 140 provides management functionalities for the management device 130. For example, the management module 140, when executed at the processor 132, may be configured to control the VM servers 110 to execute the VMs 124, and identify a corresponding SLA of the user for each of the executed VMs 124. In certain embodiments, the management module 140 stores information of the SLA for each of the VM users. Further, the management module 140 may periodically check available resource of each of the VM servers 110. When one of the VM servers 110 sends an application launching message to the management device 130 to indicate one of the software applications is to be executed on one of the executed VMs 124 in the VM server 110, the management module 140 may perform a dynamic allocation of the resources of the VM server 110 using information obtained in the corresponding SLA and the first table 142, the second table 144 and the third table 146. For example, the management module 140 may check the SLA for each user and obtain a user identification (user ID) of the user, which corresponds to a certain executed VM. When the management module 140 determines that the resources of the VM server 110 are available for execution of the software application on a specific VM 124, the management module 140 may control the VM server 110 to execute the software application on the VM 124. On the other hand, when the management module 140 determines that the resources of the VM server 110 are unavailable for execution of the software application on the VM 124, the management module 140 may perform a migrating process to move one or more of the VMs 124 running on the VM server 110, which has a lower privilege level, to other VM servers 110, thus freeing up the resources of the VM server 110 such that the software application may be executed.

The first table 142 is a table containing information of the privilege levels for each of the VMs. Specifically, when the management module 140 receives the application launching message to indicate one of the software applications is to be executed on one of the executed VMs 124 in the VM server 110, the management module 140 may use the information of the SLA corresponding to each of the executed VMs 124 to check the first table 142 in order to determine the privilege level of each of the executed VMs.

FIG. 3A schematically depicts a VM, user and privilege (VUP) table according to certain embodiments of the present disclosure. In certain embodiments, the VUP table 310 serves as the first table 142 of the management device 130. As shown in FIG. 3A, the VUP table 310 has three columns, including a VM column 312, a user column 314, and a privilege level column 316. Each row of the VUP table 310 indicates a VM identification (VMID) corresponding to each of the VMs 124, and its corresponding user ID and the privilege level. For example, as shown in FIG. 3A, the VMID1 corresponds to the user ID1, and is assigned with a privilege level 2. The VMID2 corresponds to the user ID2, and is assigned with a privilege level 1. The VMID3 corresponds to the user ID3, and is assigned with a privilege level 2. The VMID4 corresponds to the user ID4, and is assigned with a privilege level 3. Thus, based on the VMIDs, the management module 140 may look up in the VUP table 310 and obtain a corresponding user for each of the executed VMs 124 by the user ID; and then retrieve the privilege level of the executed VM 124 by looking up the privilege level corresponding to the VMID from the VUT table.

The second table 144 is a table containing resource allocation information for each of the software applications to be executed on the VMs 124 being assigned with the privilege levels. Specifically, once the management module 140 determines the privilege level of each of the executed VMs, the management module 140 may retrieve the resource allocation information for the software application to be executed on the one of the executed VMs 124 from the second table 144 based on the privilege level of the one of the executed VMs 124. In this way, the management module 140 may obtain the resources requirements for each software application to be executed on each of the executed VMs 124, and then may obtain a total resource requirement for the VM server 110 by adding up all the resources requirements for all executed VMs 124 in the VM server 110. Once the resource allocation information is obtained, the management module 140 may then determine, based on the resource allocation information for the software application to be executed, whether the resource of the VM server 110 is available for execution of the software application.

FIG. 3B schematically depicts a resources allocation table (RAT) according to certain embodiments of the present disclosure. In certain embodiments, the RAT table 320 serves as the second table 144 of the management device 130. As shown in FIG. 3B, the RAT table 320 has five columns, including an application column 322, a privilege level column 324, and three resource requirement columns 326. The resource requirement columns 326 include a network requirement column 327 storing the network bandwidth bit rate information, a CPU requirement column 328 storing the CPU load percentage information, and a memory requirement column 329 storing the free memory size requirement information. Specifically, the RAT table 320 includes the 9 different resource requirements for three software applications at three different privilege levels. For example, for application 1, the resource requirements for the privilege level 1 will include the network requirement of 8 Mbps, the CPU requirement of 25%, and the memory requirement of 4 GB; the resource requirements for the privilege level 2 will include the network requirement of 5 Mbps, the CPU requirement of 10%, and the memory requirement of 2 GB; and the resource requirements for the privilege level 3 will include the network requirement of 2 Mbps, the CPU requirement of 4%, and the memory requirement of 500 MB. Other resource requirements for different applications corresponding to different privilege levels may also be obtained in the RAT table 320. Thus, the management module 140 may retrieve the resource allocation information, and then determine, based on the resource allocation information for the software application to be executed, whether the resource of the VM server 110 is available for execution of the software application.

In certain embodiments, the software applications listed in the RAT table 320 are the commonly used software applications. If a software application is not listed in the RAT table 320, a default set of resource requirements may be assigned to the software application not listed in the RAT table 320.

In certain embodiments, when the management module 140 determines whether the resource of the VM server 110 is available for execution of the software application, the management module 140 may compare the available resource of the VM server 110 to required resource for the software application to be executed based on the resource allocation information obtained from the second table 144. When the required resource for the software application to be executed is not greater than the available resource of the VM server 110, the management module 140 may control the VM server 110 to execute the software application on the VM 124 without making any adjustment. When the required resource for the software application to be executed is greater than the available resource of the VM server 110, however, adjustments must be made such that additional resource of the VM server 110 becomes available before executing the software application on the VM 124.

The third table 146 is a table containing information of the privilege levels and corresponding permissible limit rate for each of the privilege levels. Specifically, once the management module 140 determines that use the third table to determine that the required resource for the software application to be executed is greater than the available resource of the VM server 110, adjustments must be made such that additional resource of the VM server 110 becomes available. Thus, the management module 140 may check the third table 146 to retrieve the corresponding permissible limit rate to each of the privilege levels, and then re-assign the resources of the VM server 110 to the executed software applications on all of the executed VMs 124 on the VM server 110. For example, in re-assigning the resources of the VM server 110, for each of the executed VMs 124, the resource allocated to each of the executed software applications on the executed VM 124 is reduced by the corresponding permissible limit rate based on the privilege level of the executed VM 124.

FIG. 3C schematically depicts a permissible limit table according to certain embodiments of the present disclosure. In certain embodiments, the permissible limit table 330 serves as the third table 146 of the management device 130. As shown in FIG. 3C, the permissible limit table has two columns, including a privilege level column 332 and a permissible limit rate column 334. Each row of the permissible limit table 330 indicates a privilege level and its corresponding permissible limit rate. For example, as shown in FIG. 3C, the privilege level 1 corresponds to a permissible limit rate of 0%, the privilege level 2 corresponds to a permissible limit rate of 5%, and the privilege level 3 corresponds to a permissible limit rate of 10%. In other words, for the executed VM 124 having the privilege level 1, the resources allocated to each of the executed software applications on the executed VM 124 may be reduced by the corresponding permissible limit rate of 0% (no reduction). For the executed VM 124 having the privilege level 2, the resources allocated to each of the executed software applications on the executed VM 124 may be reduced by the corresponding permissible limit rate of 5%. For the executed VM 124 having the privilege level 3, the resources allocated to each of the executed software applications on the executed VM 124 may be reduced by the corresponding permissible limit rate of 10%. Thus, for the executed VM 124 having lower privilege levels, the resources allocated to the VM 124 may be reduced with a higher permissible limit rate, such that additional resources may become available for the execution of the software application to be launched.

After the adjustments using the permissible limit rate information have been performed, the management module 120 may again determine whether the resources of the VM server 110 may be available for execution of the software application. When the resources of the VM server 110 become available for execution of the software application, the management module 120 may control the VM server 110 to execute the software application. On the other hand, if the resources of the VM server 110 are still unavailable for execution of the software application after the adjustments, the management module 120 may control the VM server 110 to migrate at least one of the executed VMs 124 having a lower privilege level on the VM server 110 to other VM servers 110 to free up the resource of the VM server 110. For example, referring back to FIG. 2, if the management module 120 determines the resources of the second VM server 110-2 to be unavailable for execution of the software application after the adjustments, the management module 120 may control the second VM server 110-2 to migrate at least one of the executed VMs 124 having a lower privilege level, such as the VM7 (which is accessed by an ordinary user) on the second VM server 110 to the other VM servers, such as the first VM server 110-1, in order to free up the resources of the second VM server 110-2.

The reason to migrate the VMs 124 having a lower privilege level is due to the down time of the migrated VMs during the migration process. Generally, migration of the VMs 124 may have a down time of about 20 seconds for the VMs 124 being migrated. Thus, it is appropriate to migrate the VMs having the lower privilege level, such that the down time does not affect the VM users as much in the case of the VMs having higher privilege levels.

It should be particularly noted that the VUP table 310, the RAT table 320 and the permissible limit table 330 are merely provided as exemplary embodiments of the first, second and third tables, and are not intended to be exhaustive or to limit the disclosure to the precise forms disclosed. In certain embodiments, the first, second and third tables may respectively contain additional information, and the information stored in the tables may be in a variety of different forms.

In certain embodiments, the management module 140 may also be used to control the VM servers 110 to execute the VMs 124. For example, when a VM server 110 is to launch a VM 124, the VM server 110 may send a VM launching message to the management device 130 to indicate the VM 124 is to be launched. Upon receiving the VM launching message, the management module 140 may retrieve, from the first table, the privilege level of the VM to be launched, and then determine whether at least one of the VM servers 110 has the available resource to launch the VM 124. It should be noted that the VM server 110 having the available resource to launch the VM 124 may be or may not be the VM server sending the VM launching message. When one of the VM servers 110 has the available resource to launch the VM 124, the management module 140 may control the VM server 110 to launch the VM on the VM server 110. If necessary, the management module 140 may re-assign the resource of the VM server 110 to the executed software applications on all of the executed VMs on the VM server 110, such that the resources of the VM server 110 become available. On the other hand, if none of the VM servers 110 has the available resource to launch the VM 124, the management module 140 may control one of the VM servers 110 to migrate at least one of the executed VMs 124 having a lower privilege level on the VM server 110 to other VM servers 110, in order to free up the resource of the VM server 110. This procedure may be performed until at least one of the VM servers 110 has the available resource to launch the VM 124.

Another aspect of the present disclosure relates to a computer implemented method of dynamically allocating resources of virtual machines. In certain embodiments, the method includes: (1) controlling, by a management device, a plurality of VM servers to execute a plurality of VMs, wherein a plurality of software applications is configured to be executed on each of the executed VMs, and the VMs are each assigned with one of a plurality of privilege levels; (2) identifying, by the management device, a service level agreement (SLA) for each of the executed VMs; and (3) in response to receiving, by the management device, an application launching message to indicate one of the software applications is to be executed on one of the executed VMs in one of the VM servers, (a) determining, from a first table containing information of the privilege levels for each of the VMs, the privilege level of each of the executed VMs based on information of the SLAs corresponding to the executed VMs; (b) retrieving, from a second table containing resource allocation information for each of the software applications to be executed on the VMs being assigned with the privilege levels, the resource allocation information for the software application to be executed on the one of the executed VMs based on the privilege level of the one of the executed VMs; (c) determining, based on the resource allocation information for the software application to be executed, whether resource of the VM server is available for execution of the software application; (d) in response to determining the resource of the VM server to be unavailable for execution of the software application, migrating at least one of the executed VMs having a lower privilege level on the VM server to other VM servers to free up the resource of the VM server; and (e) in response to determining the resource of the VM server to be available for execution of the software application, controlling the VM server to execute the software application.

Figure 4:
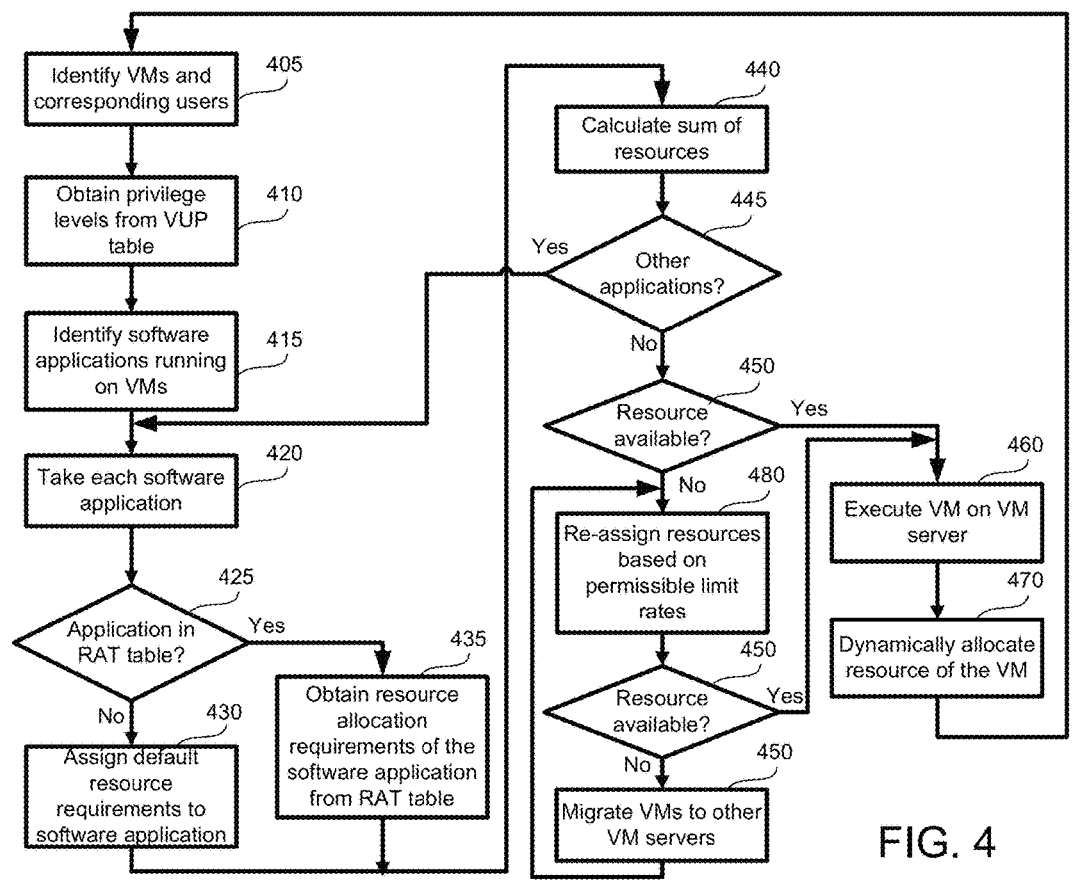
FIG. 4 shows a flowchart of a method for dynamically allocating resources of virtual machines according to certain embodiments of the present disclosure.

FIG. 4 shows a flowchart of a method for dynamically allocating resources of virtual machines according to certain embodiments of the present disclosure. In certain embodiments, the method may be implemented by the system 100 as shown in FIG. 1B. Specifically, the method may be implemented by the execution of the management module 140 at the processor 132 of the management device 130 of the system 100. It should be noted that the method as shown in FIG. 4 merely represent certain embodiments of the present disclosure, and is not intended to be exhaustive or to limit the disclosure to the precise forms disclosed.

At procedure 405, the management device 130 identifies the VMs 124 running on the VM servers 110 and the corresponding users. In certain embodiments, the identification may be performed with the SLAs of the users. At procedure 410, the management device 130 obtains the privilege levels from the VUP table 310 (i.e., the first table). At procedure 415, the management device 130 identifies the software applications running on the VMs 124.

At procedure 420, the management device 130 starts allocating the resources of the VM servers 110 by taking each of the software applications into account. At procedure 425, the management device 130 checks if the software application is listed in the RAT table 320 (i.e., the second table). As disclosed above, the software applications listed in the RAT table 320 are the commonly used software applications. If the software application is not listed in the RAT table 320, at procedure 430, a default set of resource requirements may be assigned by the management device 130 to the software application not listed in the RAT table 320. On the other hand, if the software application is listed in the RAT table 320, at procedure 435, the management device 130 may obtain the resource requirement information of the software application based on the privilege level from the RAT table 320.

At procedure 440, the management device 130 calculates the sum of each resource based on the resource requirement information obtained from the RAT table 320. At procedure 445, the management device 130 checks if there is any additional software application to be checked. If so, the management device 130 goes back to procedure 420.

When all the software applications have been checked, at procedure 450, the management device 130 determines, based on the resource requirement information obtained from the RAT table 320, whether there is any resource available in the VM server 110 to launch the software application. If there is resource available in the VM server 110, at procedure 460, the management device 130 controls the VM server 110 to execute the software application on the executed VM 124. After the software application is executed, at procedure 470, the management device 130 dynamically allocates the resources of the VM 124 on which the software application is running.

If there is no resource available in the VM server 110, at procedure 480, the management device 130 controls the VM server 110 to re-assign the resources of other executed VMs 124 based on the permissible limit rates obtained from the permissible limit table 330 (i.e., the third table). After re-assigning the resources, at procedure 485, the management device 130 again determines, based on the resource requirement information obtained from the RAT table 320, whether there is any resource available in the VM server 110 to launch the software application. If there is resource available in the VM server 110, at procedure 460, the management device 130 goes to procedures 460 and 470. On the other hand, if there is still no resource available in the VM server 110 after re-assigning the resources, at procedure 490, the management device 130 may control the VM server 110 to migrate some VMs 124 to other VM servers 110 in order to free up the resources in the VM server 110. In certain embodiments, the VMs 124 to be migrated are the VMs 124 having a lower privilege level.

Figure 5:
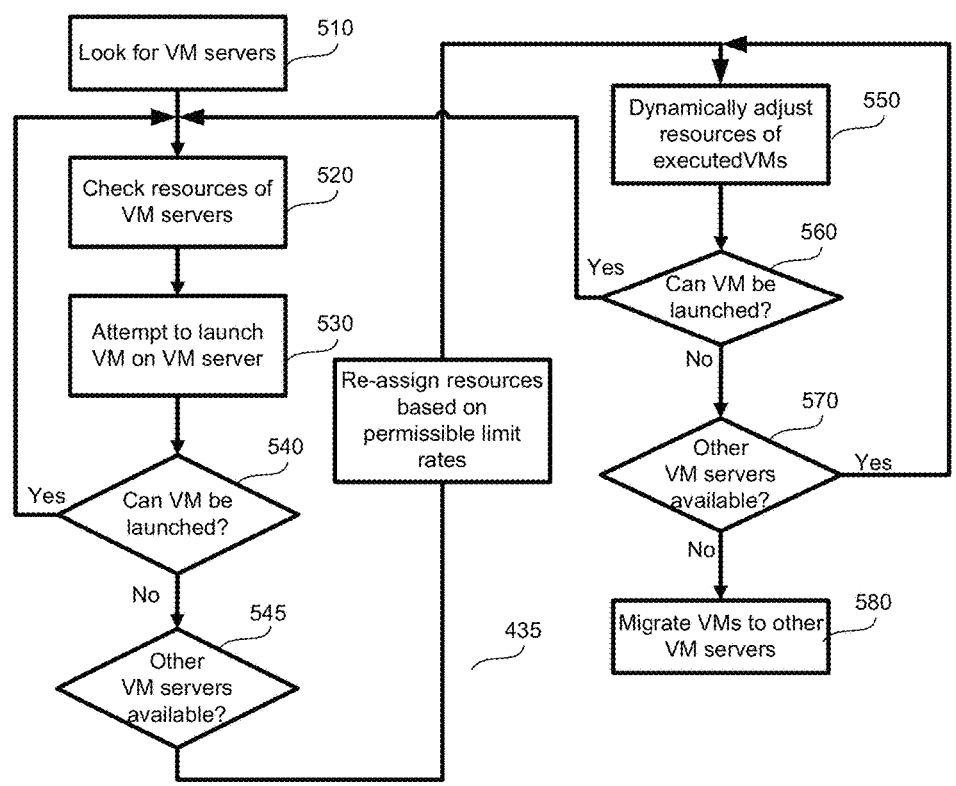
FIG. 5 shows a flowchart of a method for dynamically allocating resources in launching a virtual machine on a virtual machine server according to certain embodiments of the present disclosure.

FIG. 5 shows a flowchart of a method for dynamically allocating resources in launching a virtual machine on a virtual machine server according to certain embodiments of the present disclosure. In certain embodiments, the method may be implemented by the system 100 as shown in FIG. 1B. Specifically, the method may be implemented by the execution of the management module 140 at the processor 132 of the management device 130 of the system 100. It should be noted that the method as shown in FIG. 5 merely represent certain embodiments of the present disclosure, and is not intended to be exhaustive or to limit the disclosure to the precise forms disclosed.

At procedure 510, at the start of the procedures, the management device 130 looks for all the VM servers 110 available to launch the VM 124. It should be noted that there may be more than one VM 124 to be launched in the same VM server 110 or in different VM servers 110 at the same time. At procedure 520, the management device 130 checks the resources of each of the available VM servers 110 one-by-one in a specific order. The resources may include, without being limited to, the memory load, the graphical processing unit (GPU) load, the CPU load, the GPU memory usage, and the network bandwidth usage.

At procedure 530, the management device 130 controls the VM server 110 to attempt to launch the VM 124. Specifically, the management device 130 may find the user associated with the VM 124 to be launched, and check the resources to be consumed by the VM 124. It should be noted that the attempt to launch the VM 124 may be successful or not, depending on the availability of the resources of the VM server 110. At procedure 540, the management device 130 checks if the VM 124 may be successfully launched or not. If the VM 124 has been successfully launched, the management device 130 may go back to procedure 520 to perform other VM launching processes. If the VM 124 cannot be successfully launched, at procedure 545, the management device 130 checks if there is any other VM servers 110 with resources available. When there is at least one other VM server 110 available, the management device 130 goes back to procedure 540 to see if the VM 124 may been successfully launched in this VM server 110 or not. On the other hand, if there is no other VM servers 110 with resources available, at procedure 550, the management device 130 may dynamically adjust the resources of the VM servers 110 one-by-one to free up resources of the VM servers 110.

At procedure 560, the management device 130 again checks if the VM 124 may be successfully launched or not. If the VM 124 has been successfully launched, the management device 130 may go back to procedure 520 to perform other VM launching processes. If the VM 124 cannot be successfully launched, at procedure 570, the management device 130 checks if there is any other VM servers 110 with resources available. When there is at least one other VM server 110 available, the management device 130 goes back to procedure 550 to dynamically adjust the resources of the VM servers 110 to free up resources of the VM servers 110. On the other hand, if there is no other VM servers 110 with resources available, at procedure 580, the management device 130 may control the VM server 110 to migrate some VMs 124 to other VM servers 110 in order to free up the resources in the VM server 110 for launching the VM 124. In certain embodiments, the VMs 124 to be migrated are the VMs 124 having a lower privilege level.

In yet another aspect, the present disclosure relates to a non-transitory computer readable medium storing computer executable code. In certain embodiments, the computer executable code may be the management module 140 as described above for performing on-demand write through operations. In certain embodiments, the non-transitory computer readable medium may include, but not limited to, the storage device 134 as described above, or any other storage media of the management device 130.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a plurality of virtual machine (VM) servers configured to execute a plurality of VMs, and to execute a plurality of software applications on each of the executed VMs, wherein the VMs are each assigned with one of a plurality of privilege levels; and
a management device communicatively connected to the VM servers, the management device comprising a processor and a storage device storing computer executable code, a first table containing information of the privilege levels for each of the VMs, a second table containing resource allocation information for each of the software applications to be executed on the VMs being assigned with the privilege levels, and a third table storing information of the privilege levels and corresponding permissible limit rate for each of the privilege levels, wherein each of the corresponding permissible limit rate for each of the privilege levels is a percentage value, and for each of the software applications listed in the second table, the software application to be executed on the VMs being assigned with each of the privilege levels corresponds to a different one of the resource allocation information, and for each of the privilege levels listed in the second table, each of the software applications to be executed on the VMs being assigned with the privilege level corresponds to a different one of the resource allocation information;
wherein the computer executable code, when executed at the processor, is configured to:
control the VM servers to execute the VMs;
identify, for each of the executed VMs, a service level agreement (SLA);
periodically check available resource of each of the VM servers; and
in response to receiving an application launching message to indicate one of the software applications is to be executed on one of the executed VMs in one of the VM servers,
determine, from the first table, the privilege level of each of the executed VMs based on information of the SLAs corresponding to the executed VMs;
retrieve, from the second table, the resource allocation information for the software application to be executed on the one of the executed VMs based on the privilege level of the one of the executed VMs;
determine, based on the resource allocation information for the software application to be executed, whether resource of the one of the VM servers is available for execution of the software application;
in response to determining the resource of the one of the VM servers to be unavailable for execution of the software application, adjust the resource of the one of the VM servers one-by-one by using corresponding permissible limit rates to free up the resource of the one of the VM servers such that the sum of each resource used by each VM running in the one of the VM servers is no greater than total resources available in the one of the VM servers, wherein each resource allocated to each of executed software applications on the each VM is reduced by the corresponding permissible limit rate;
in further response to determining the resource of the one of VM servers to be unavailable for execution of the software application, migrate at least one of the executed VMs having a lower privilege level on the one of the VM servers to other VM servers to free up the resource of the one of the VM servers; and
in response to determining the resource of the one of the VM servers to be available for execution of the software application, control the one of the VM servers to execute the software application.

2. The system as claimed in claim 1, wherein the computer executable code, when executed at the processor, is configured to identify the SLA for each of the executed VMs by:

identifying, for each of the executed VMs, a corresponding user; and
identifying the SLA of the corresponding user for each of the executed VMs.

3. The system as claimed in claim 1, wherein the first table is a VM, user and privilege (VUP) table, storing information of a plurality of VM identifications (VMIDs) corresponding to the VMs, a plurality of user identifications corresponding to users of the VMs, and the privilege levels corresponding to each of the VM identifications and each of the user identifications.

4. The system as claimed in claim 3, wherein the computer executable code, when executed at the processor, is configured to determine, from the first table, the privilege level of each of the executed VMs by:
for each of the executed VMs, obtaining the VMID of the executed VM; and
retrieving the privilege level of the executed VM by looking up the privilege level corresponding to the VMID from the first table.

5. The system as claimed in claim 4, wherein the VMID is obtained from the SLA corresponding to the executed VM.

6. The system as claimed in claim 1, wherein the second table is a resource allocation table (RAT) storing information of the software applications, the privilege levels, and the resource allocation information for each of the software applications corresponding to each of the privilege levels.

7. The system as claimed in claim 6, wherein the resource of the one of the VM servers comprises network bandwidth of the one of the VM servers, central processing unit (CPU) load of the one of the VM servers, and free system memory space of the one of the VM servers.

8. The system as claimed in claim 7, wherein for each of the software applications, the resource allocation information comprises information of a network bandwidth bit rate of the one of the VM servers, a CPU load percentage of the one of the VM servers, and a free memory size of the one of the VM servers.

9. The system as claimed in claim 1, wherein the computer executable code, when executed at the processor, is configured to determine whether the resource of the one of the VM servers is available for execution of the software application by:
comparing the available resource of the one of the VM servers to required resource for the software application to be executed based on the resource allocation information;
when the required resource for the software application to be executed is not greater than the available resource of the one of the VM servers, executing the software application on the one of the VM servers; and
when the required resource for the software application to be executed is greater than the available resource of the one of the VM servers,
retrieving, from the third table, the percentage value of the corresponding permissible limit rate to each of the privilege levels;
re-assigning the resource of the one of the VM servers to the executed software applications on all of the executed VMs on the one of the VM servers, wherein for each of the executed VMs, the resource allocated to each of the executed software applications on the executed VM is reduced by the percentage value of the corresponding permissible limit rate based on the privilege level of the executed VM; and determining whether the re-assigned resource of the one of the VM servers is available for execution of the software application.

10. The system as claimed in claim 1, wherein the computer executable code, when executed at the processor, is configured to control the VM servers to execute the VMs by:
in response to receiving a VM launching message to indicate one of the VMs is to be launched,
retrieving, from the first table, the privilege level of the VM to be launched;
determining whether at least one of the VM servers has the available resource to launch the VM;
when none of the VM servers has the available resource to launch the VM, migrating at least one of the executed VMs having a lower privilege level on one of the VM servers to other VM servers to free up the resource of the one of the VM servers until at least one of the VM servers has the available resource to launch the VM; and
when one of the VM servers has the available resource to launch the VM, launching the VM on the one of the VM servers, and re-assigning the resource of the one of the VM servers to the executed software applications on all of the executed VMs on the one of the VM servers.

11. A method for dynamically allocating resources of virtual machines (VMs), comprising:
controlling, by a management device, a plurality of VM servers to execute a plurality of VMs, wherein a plurality of software applications is configured to be executed on each of the executed VMs, and the VMs are each assigned with one of a plurality of privilege levels;
identifying, by the management device, a service level agreement (SLA) for each of the executed VMs;
periodically checking available resource of each of the VM servers; and
in response to receiving, by the management device, an application launching message to indicate one of the software applications is to be executed on one of the executed VMs in one of the VM servers,
determining, from a first table containing information of the privilege levels for each of the VMs, the privilege level of each of the executed VMs based on information of the SLAs corresponding to the executed VMs;
retrieving, from a second table containing resource allocation information for each of the software applications to be executed on the VMs being assigned with the privilege levels, the resource allocation information for the software application to be executed on the one of the executed VMs based on the privilege level of the one of the executed VMs, wherein for each of the software applications listed in the second table, the software application to be executed on the VMs being assigned with each of the privilege levels corresponds to a different one of the resource allocation information, and for each of the privilege levels listed in the second table, each of the software applications to be executed on the VMs being assigned with the privilege level corresponds to a different one of the resource allocation information;
determining, based on the resource allocation information for the software application to be executed, whether resource of the one of the VM servers is available for execution of the software application;
in response to determining the resource of the one of the VM servers to be unavailable for execution of the software application, adjust the resource of the one of the VM servers one-by-one by using corresponding permissible limit rates to free up the resource of the one of the VM servers such that the sum of each resource used by each VM running in the one of the VM servers is no greater than total resources available in the one of the VM servers, wherein each resource allocated to each of executed software applications on the each VM is reduced by the corresponding permissible limit rate;
in further response to determining the resource of the one of the VM servers to be unavailable for execution of the software application, migrating at least one of the executed VMs having a lower privilege level on the one of the VM servers to other VM servers to free up the resource of the one of the VM servers; and
in response to determining the resource of the one of the VM servers to be available for execution of the software application, controlling the one of the VM servers to execute the software application;
wherein whether the resource of the one of the VM servers is available for execution of the software application is determined by:
comparing the available resource of the one of the VM servers to required resource for the software application to be executed based on the resource allocation information; and
when the required resource for the software application to be executed is greater than the available resource of the one of the VM servers,
retrieving, from a third table storing information of the privilege levels and corresponding permissible limit rate for each of the privilege levels, the corresponding permissible limit rate to each of the privilege levels, wherein each of the corresponding permissible limit rate for each of the privilege levels is a percentage value;
re-assigning the resource of the one of the VM servers to the executed software applications on all of the executed VMs on the one of the VM servers, wherein for each of the executed VMs, the resource allocated to each of the executed software applications on the executed VM is reduced by the percentage value of the corresponding permissible limit rate based on the privilege level of the executed VM; and
determining whether the re-assigned resource of the one of the VM servers is available for execution of the software application.

12. The method as claimed in claim 11, wherein for each of the executed VMs, the SLA is identified by:
identifying, for each of the executed VMs, a corresponding user; and
identifying the SLA of the corresponding user for each of the executed VMs.

13. The method as claimed in claim 11, wherein the first table is a VM, user and privilege (VUP) table, storing information of a plurality of VM identifications (VMIDs) corresponding to the VMs, a plurality of user identifications corresponding to users of the VMs, and the privilege levels corresponding to each of the VM identifications and each of the user identifications.

14. The method as claimed in claim 13, wherein the privilege level of each of the executed VMs is determined by:
obtaining the VMID of the executed VM from the SLA corresponding to the executed VM; and
retrieving the privilege level of the executed VM by looking up the privilege level corresponding to the VMID from the first table.

15. The method as claimed in claim 11, wherein the second table is a resource allocation table (RAT) storing information of the software applications, the privilege levels, and the resource allocation information for each of the software applications corresponding to each of the privilege levels.

16. The method as claimed in claim 15, wherein:
the resource of the one of the VM servers comprises network bandwidth of the one of the VM servers, central processing unit (CPU) load of the VM server, and free system memory space of the one of the VM servers; and
for each of the software applications, the resource allocation information comprises information of a network bandwidth bit rate of the one of the VM servers, a CPU load percentage of the one of the VM servers, and a free memory size of the one of the VM servers.

17. The method as claimed in claim 11, wherein whether the resource of the one of the VM servers is available for execution of the software application is further determined by:
when the required resource for the software application to be executed is not greater than the available resource of the one of the VM servers, executing the software application on the one of the VM servers.

18. The method as claimed in claim 11, wherein the VM servers are controlled to execute the VMs by:
in response to receiving a VM launching message to indicate one of the VMs is to be launched,
retrieving, from the first table, the privilege level of the VM to be launched;
determining whether at least one of the VM servers has the available resource to launch the VM;
when none of the VM servers has the available resource to launch the VM, migrating at least one of the executed VMs having a lower privilege level on one of the VM servers to other VM servers to free up the resource of the one of the VM servers until at least one of the VM servers has the available resource to launch the VM; and
when one of the VM servers has the available resource to launch the VM, launching the VM on the one of the VM servers, and re-assigning the resource of the one of the VM servers to the executed software applications on all of the executed VMs on the one of the VM servers.

19. A non-transitory computer readable medium storing computer executable code, wherein the computer executable code, when executed at a processor of a management device of a system, is configured to:
control a plurality of VM servers to execute a plurality of VMs, wherein the management device is communicatively connected to the VM servers, a plurality of software applications is configured to be executed on each of the executed VMs, and the VMs are each assigned with one of a plurality of privilege levels;
identify, for each of the executed VMs, a service level agreement (SLA);
periodically check available resource of each of the VM servers; and
in response to receiving an application launching message to indicate one of the software applications is to be executed on one of the executed VMs in one of the VM servers,
determine, from a first table containing information of the privilege levels for each of the VMs, the privilege level of each of the executed VMs based on information of the SLAs corresponding to the executed VMs;
retrieve, from a second table containing resource allocation information for each of the software applications to be executed on the VMs being assigned with the privilege levels, the resource allocation information for the software application to be executed on the one of the executed VMs based on the privilege level of the one of the executed VMs, wherein for each of the software applications listed in the second table, the software application to be executed on the VMs being assigned with each of the privilege levels corresponds to a different one of the resource allocation information, and for each of the privilege levels listed in the second table, each of the software applications to be executed on the VMs being assigned with the privilege level corresponds to a different one of the resource allocation information;
determine, based on the resource allocation information for the software application to be executed, whether resource of the one of the VM servers is available for execution of the software application;
in response to determining the resource of the one of the VM servers to be unavailable for execution of the software application, adjust the resource of the one of the VM servers one-by-one by using corresponding permissible limit rates to free up the resource of the one of the VM servers such that the sum of each resource used by each VM running in the one of the VM servers is no greater than total resources available in the one of the VM servers, wherein each resource allocated to each of executed software applications on the each VM is reduced by the corresponding permissible limit rate;
in further response to determining the resource of the one of the VM servers to be unavailable for execution of the software application, migrate at least one of the executed VMs having a lower privilege level on the one of the VM servers to other VM servers to free up the resource of the VM server; and
in response to determining the resource of the one of the VM servers to be available for execution of the software application, control the one of the VM servers to execute the software application;
wherein the computer executable code, when executed at the processor, is configured to determine whether the resource of the one of the VM servers is available for execution of the software application by:
comparing the available resource of the one of the VM servers to required resource for the software application to be executed based on the resource allocation information; and
when the required resource for the software application to be executed is greater than the available resource of the one of the VM servers,
retrieving, from a third table storing information of the privilege levels and corresponding permissible limit rate for each of the privilege levels, the corresponding permissible limit rate to each of the privilege levels, wherein each of the corresponding permissible limit rate for each of the privilege levels is a percentage value;

re-assigning the resource of the one of the VM servers to the executed software applications on all of the executed VMs on the one of the VM servers, wherein for each of the executed VMs, the resource allocated to each of the executed software applications on the executed VM is reduced by the percentage value of the corresponding permissible limit rate based on the privilege level of the executed VM; and determining whether the re-assigned resource of the one of the VM servers is available for execution of the software application.

20. The non-transitory computer readable medium as claimed in claim 19, wherein the computer executable code, when executed at the processor, is configured to identify the SLA for each of the executed VMs by:

identifying, for each of the executed VMs, a corresponding user; and identifying the SLA of the corresponding user for each of the executed VMs.

21. The non-transitory computer readable medium as claimed in claim 19, wherein the first table is a VM, user and privilege (VUP) table, storing information of a plurality of VM identifications (VMIDs) corresponding to the VMs, a plurality of user identifications corresponding to users of the VMs, and the privilege levels corresponding to each of the VM identifications and each of the user identifications.

22. The non-transitory computer readable medium as claimed in claim 21, wherein the computer executable code, when executed at the processor, is configured to determine, from the first table, the privilege level of each of the executed VMs by:

for each of the executed VMs, obtaining the VMID of the executed VM from the SLA corresponding to the executed VM; and retrieving the privilege level of the executed VM by looking up the privilege level corresponding to the VMID from the first table.

23. The non-transitory computer readable medium as claimed in claim 19, wherein the second table is a resource allocation table (RAT) storing information of the software applications, the privilege levels, and the resource allocation information for each of the software applications corresponding to each of the privilege levels.

24. The non-transitory computer readable medium as claimed in claim 23, wherein:

the resource of the one of the VM servers comprises network bandwidth of the one of the VM servers, central processing unit (CPU) load of the one of the VM servers, and free system memory space of the one of the VM servers; and for each of the software applications, the resource allocation information comprises information of a network bandwidth bit rate of the one of the VM servers, a CPU load percentage of the one of the VM servers, and a free memory size of the one of the VM servers.

25. The non-transitory computer readable medium as claimed in claim 19, wherein the computer executable code, when executed at the processor, is further configured to determine whether the resource of the one of the VM servers is available for execution of the software application by:

when the required resource for the software application to be executed is not greater than the available resource of the one of the VM servers, executing the software application on the one of the VM servers.

26. The non-transitory computer readable medium as claimed in claim 19, wherein the computer executable code, when executed at the processor, is configured to control the VM servers to execute the VMs by:

in response to receiving a VM launching message to indicate one of the VMs is to be launched, retrieving, from the first table, the privilege level of the VM to be launched;

determining whether at least one of the VM servers has the available resource to launch the VM;

when none of the VM servers has the available resource to launch the VM, migrating at least one of the executed VMs having a lower privilege level on one of the VM servers to other VM servers to free up the resource of the one of the VM servers until at least one of the VM servers has the available resource to launch the VM; and when one of the VM servers has the available resource to launch the VM, launching the VM on the one of the VM servers, and re-assigning the resource of the one of the VM servers to the executed software applications on all of the executed VMs on the one of the VM servers.

* * * * *